United States Patent Office 3,171,079
Patented Feb. 23, 1965

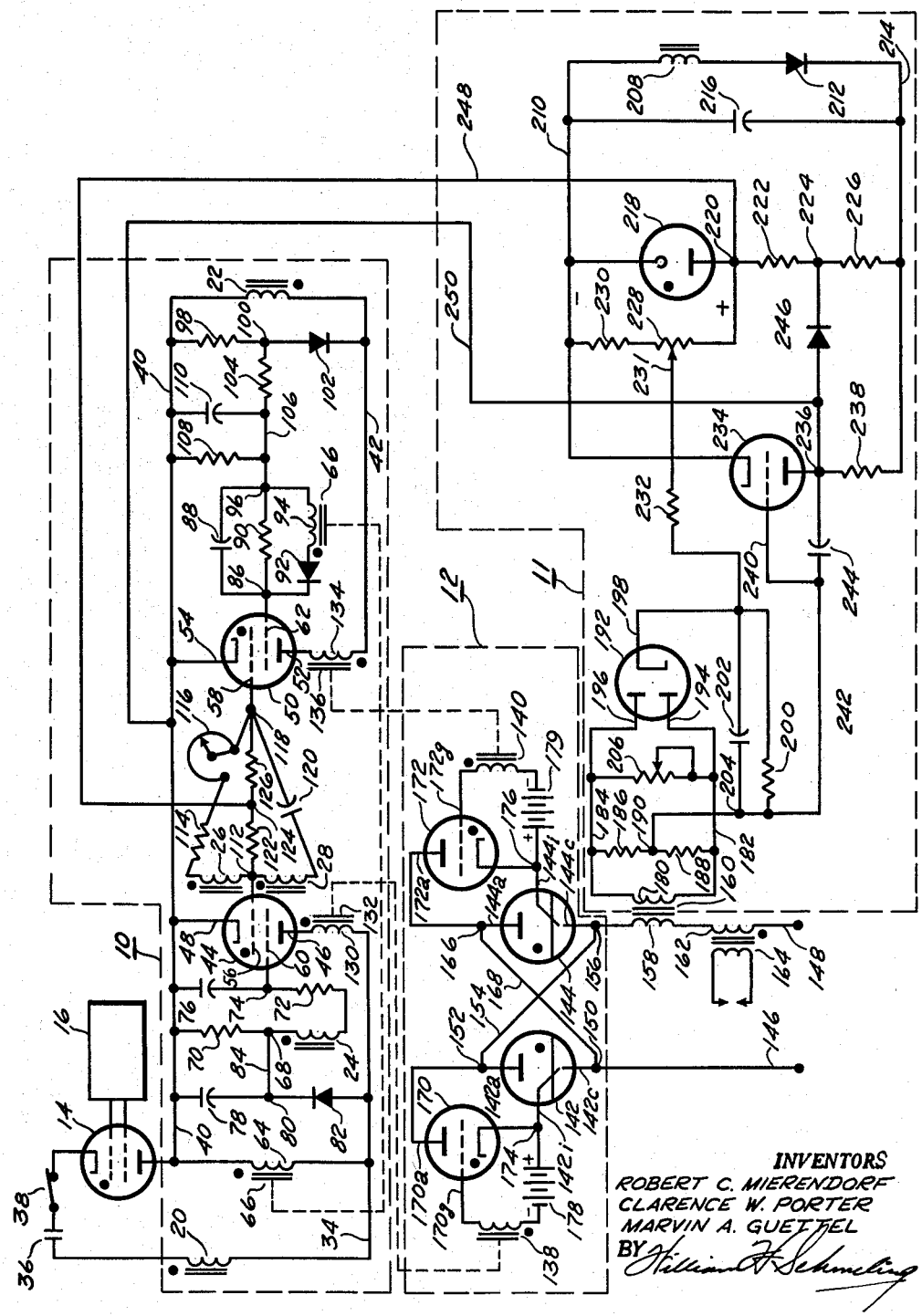

3,171,079
CONTROL CIRCUIT FOR A LOAD INCLUDING A HIGH FLUX DENSITY TRANSFORMER
Robert C. Mierendorf, Wauwatosa, Clarence W. Porter, Glendale, and Marvin A. Guettel, Milwaukee, Wis., assignors to Square D Company, Park Ridge, Ill., a corporation of Michigan
Filed Oct. 24, 1960, Ser. No. 64,480
7 Claims. (Cl. 323—58)

This invention relates to control circuits and is more particularly concerned with a circuit and apparatus which will control current flow through a load which includes a high flux density transformer.

The use of high flux density transformers is rapidly increasing, particularly in the field of resistance welders wherein these units are used to supply welding current to the welding electrodes. While the use of high flux density transformers in these applications has resulted in certain advantages, they have engendered problems which have proved troublesome. One of the problems encountered is the occurrence of high transient currents which are formed in the transformer primary winding during the initial flow of current therethrough. A solution for this problem is disclosed in an application for patent Serial No. 723,183, filed March 23, 1958, by Clarence W. Porter, one of the inventors of the invention disclosed herein. In the Porter application, a circuit is disclosed which will minimize transients in the welding transformer. This result is achieved by controlling the current flow to the transformer by a pair of inversely connected electronic switches such as ignitrons and by causing the ignitrons to conduct in a lead-trail sequence. The system further includes an arrangement whereby the lead ignitron is caused to be rendered conductive during the initial half cycle of current flow to the welding transformer primary at approximately 85°, after the supply voltage wave passes through zero in a direction which will cause the lead tube to be conductive. After the initial half cycle of current flow through the transformer the conduction trail ignitrons have their conduction controlled by a conventional phase shift arrangement.

Present assembly line welding applications often require welding of a varying number of steel sheets with a single welding apparatus without adjustment of the welding controller. Theoretically, it has been determined that welding currents should be increased with increases in the thickness of the metals to be welded. The exact value of current increase required depends on the total thickness change of the welded material. However, it has been determined that satisfactory welds of varying numbers of sheets and/or sheets of varying thickness can be made provided the welding current is held to one carefully selected value. This is possible due to the wide tolerance permitted in weld energy for steel. In practice, however, a carefully selected value of welding current cannot be maintained due to variations of line voltages and changes in the impedance of the secondary circuit of the welding transformer which is caused by the variations in the material to be welded. Ideally, the regulator should sense the thicker sections of steel and actually overcompensate; that is, welding current above its nominal value when load conditions so dictate. None of the present type current regulators are capable of doing this. The device herein described will overcompensate the welding current with line or load variation that would normally cause the welding current to vary ±10%. By providing overcompensation, the problems encountered in welding varying thicknesses of stock in the same welding sequence can be materially reduced to provide satisfactory welds. It is therefore an object of the present invention to provide an improved current regulator for a resistance welding which is characterized by its simplified circuitry.

Another object of the present invention is to provide a current regulator for a resistance welder which is energized by the peak values of the current flow through the primary winding of the welding transformer.

A further object of the present invention is to energize the current regulator with the peak value of the current flowing through the primary winding of a welding transformer and thereby overcompensate the root mean square value of the regulated current flow of current through the transformer in response to variations in the supply voltage and impedance in the circuit connected to the secondary winding of the transformer.

Another object of the present invention is to provide a resistance welder with a current regulator which will maintain a substantially constant current flow through the primary winding of the welding transformer of the welder in spite of variations in the voltage of the power source for the welder and changes in impedance in the secondary winding output circuit of the welding transformer.

It is a further object of the present invention to control the flow of current through the primary winding of a welding transformer of a resistance welder with a means which will minimize transients in the transformer and a means which will maintain a substantially constant current flow in the primary winding of the transformer regardless of variations in the voltage of the source for the welder or changes in impedance in the secondary winding circuit of the transformer.

In carrying out the preceding object, it is another object of the present invention to provide the welder with a pair of electronic switches for controlling the current flow from the source to the primary transformer winding and to control the conduction of the switches with an adjustable phase shift network which is connected with the means for maintaining a constant current in the primary winding of the transformer.

Another object of the present invention is to provide a resistance welder with a pair of electronic switches which are connected to pass alternate half cycles of current from an alternating current source to a load which includes the primary winding of a welding transformer and to control the conduction of the switches with a means independent of current flow in the load which will cause the first of said switches to conduct at a predetermined point on the voltage wave of the source during the first half cycle of conduction of the first switch and to thereafter control the conduction of both of the switches with a phase shift network which has its output arranged to normally cause the switches to have maximum current conduction and which is connected to a means responsive to the peak value of current flow in the load for varying the output of the phase shift network for reducing the current conduction of the switches to a value which will maintain the current flow in the load substantially constant independently of variations in voltage of the source or changes in impedance in the circuit connected with the secondary winding of the transformer.

Further objects and features of the invention will be readily apparent to those skilled in the art from the specification and appended drawing wherein the single figure diagrammatically shows a wiring diagram of a control circuit embodying the features according to the present invention.

In the drawings, the numeral 10 is used to designate a heat control panel, the numeral 12 is used to designate an ignitron panel of a welding apparatus and the numeral 11 a current regulator. The heat control panel 10 may be used with any suitable weld timer and in the particular embodiment shown, is arranged to be controlled by the conduction of a tube 14 which is basically a part of the weld timer, diagrammatically shown as 16, which is more fully described in application Serial No. 723,182, which is assigned to the assignee of the present invention, and now Patent No. 3,015,067. The relay switch contacts 36 and the weld-no-weld switch 38 may also be part of the weld timer.

A transformer has a primary winding, not shown, connected to a suitable alternating current power supply to energize secondary windings 20, 22, 24, 26, 28 and 208. One end of the winding 20 is connected to a lead 34 and the other end is connected through a series circuit including the normally open relay contacts 36, a normally closed switch 38 and the tube to a lead 40. The transformer winding 22 has its respective ends connected to lead 40 and to a lead 42. An electronic device, such as a gas filled electronic tube 44 which acts as a lead tube, has an anode 46 connected through a primary winding 130 of a transformer 132 to lead 34 and a cathode 48 directly connected to lead 40. A second electronic device, such as a gas filled electronic tube 50 which is designated as a trail tube, has an anode 52 connected through a primary winding 134 of a transformer 136 to lead 42 and the cathode 54 connected to lead 40. The tubes 44 and 50 each have control grids 56 and 58 respectively and shield grids 60 and 62 respectively. A primary winding 64 of a transformer 66 is connected between leads 40 and 34. The winding 24 has one of its ends connected through a junction 68 and a resistance 70 to lead 40 and has its other end connected through a resistance 72 to a junction 74 which in turn is connected through a capacitor 76 to lead 40. The junction 74 is connected to the shield grid 60. A capacitor 78 has one of its terminals connected to lead 40 and its other terminal connected through a junction 80 and a rectifying diode 82 to lead 34. The junctions 80 and 68 are interconnected by a lead 84. The shield grid 62 is connected through a junction 86 which in turn is connected through a parallel circuit comprising a capacitor 88, a resistance 90, and a series circuit consisting of rectifying diode 92 and the secondary winding 94 of the transformer 66 to a junction 96. A resistance 98 is connected between the lead 40 and a junction 100 which in turn is connected through a rectifying diode 102 to lead 42. A resistance 104 has one of its ends connected to junction 100 and its other end connected by a lead 106 to junction 96. Connected in parallel between the lead 106 and the lead 40 is a resistance 108 and a capacitor 110. The control grids 56 and 58 are connected to a phase shift network comprising the secondary windings 26 and 28 which are connected together at a junction 112. The winding 26 is also connected through a series connected resistor 114 and a potentiometer resistor 116 to a junction 118. The transformer winding 28 is also connected through a capacitor 120 to junction 118. Connected between the junction 112 and 118 in series are a resistor 122, a junction 124 and a resistor 126. The control grid 56 of tube 44 is connected to junction 112 while its cathode 48 is connected through a means which will be hereinafter described to junction 124. Likewise, the control grid 58 of tube 50 is connected to junction 118 while cathode 54 is connected through a means which will be hereinafter described to the junction 124.

The ignitron panel 12 includes a pair of electronic switches shown as ignitrons 142 and 144 which are connected in an inverse parallel arrangement to act as lead and trail tubes to pass alternate half cycles of alternating current from an alternating current source, not shown, which is connected to leads 146 and 148. The ignition 142 has a cathode electrode 142c connected through a junction 150 to lead 146 and an anode electrode 142a connected through a junction 152 and a lead 154 to a junction 156 which in turn is connected through a primary winding 158 of a transformer 160 and a primary winding 162 of a transformer 164 to lead 148. The ignitron 144 has a cathode 144c connected to junction 156 and has an anode electrode 144a connected through a junction 166 and a lead 168 to junction 150. The ignitrons 142 and 144 each have ignitor electrodes 142i and 144i for initiating the conduction of the ignitrons 142 and 144.

The ignitron panel 12 also includes a pair of electronic switches or tubes 170 and 172 which are preferably of the gas filled type, such as thyratrons. The tube 170 has an anode 170a connected to junction 152 and a cathode 170c connected through a junction 174 to the ignitor 142i. The tube 172 has an anode 172a connected to junction 166 and a cathode connected through a junction 176 to the ignitor 144i. The tubes 170 and 172 are normally biased against conduction by a suitable means such as batteries 178 and 179, which are respectively connected between the grids and cathodes of the tubes 170 and 172. The bias provided by battery 178 between a control grid 170g of tube 170 and the cathode 170c is overcome by the output of the secondary winding 138 and the bias provided by battery 179 between a control grid 172g and the cathode 170c is overcome by the output of a secondary winding 140.

The secondary winding 180 of transformer 160 is connected to a pair of leads 182 and 184. Connected between leads 182 and 184 is a resistance voltage divider consisting of a pair of series connected resistors 186 and 188 which have a common junction 190. The resistor divider is included to balance the output of the secondary winding 180 and may be omitted if the secondary winding is provided with a center tap that is arranged so the voltage output of the respective sections are equal. The output of the transformer secondary winding 180 is rectified by a suitable vacuum rectifier tube 192 which has a pair of anodes 194 and 196 and a cathode 198. The anodes 194 and 196 are respectively connected to leads 182 and 184 and the cathode is connected to the junction 190 through a parallel circuit consisting of a resistor 200 and a capacitor 202. If desired, an adjustable resistor 206 may also be connected between leads 182 and 184 to vary the output of the secondary winding 180 to the rectifier tube 192.

The supply transformer secondary winding 208 has one of its terminals connected to lead 210 and its other terminal connected through a diode 212 to lead 214. A capacitor 216 is connected between leads 210 and 214 to filter the output of the secondary winding 208 which is rectified by a diode 212. A voltage regulating electronic tube 218 has a cathode connected to lead 210 and an anode connected to lead 214 through a voltage divider consisting of a junction 220, a resistor 222, a junction 224 and a resistor 226. The tube 218 is the type which maintains the voltage between junction 220 and lead 210 substantially constant. Also connected in series between junction 220 and lead 210 is an adjustable resistor 228 and a resistor 230. An adjustable slider 231 of resistor 228 is connected through a current limiting resistor 232 to the cathode 198.

A grid controlled vacuum type electronic tube 234 has a cathode directly connected to lead 210 and an anode connected through a junction 236 and a current limiting resistor 238 to lead 214. The grid 240 which controls the conduction of tube 234 is connected through a lead 242 to a junction 204 which is located between the capacitor 202 and the junction 190. A capacitor 244 is connected between lead 242 and junction 236. A diode 246 is connected between junction 224 and junction 236. A lead 248 connects the junction 220 in the current regulator 11 with the junction 124 in phase shift circuit of the heat control panel 10 and a lead 250 connects the junction 236 in the current regulator 11 to lead 40 in the heat control panel 10.

The transformer secondary 208, the diode 212, the resistors 226, 222 and the voltage regulating tube 218 provide a constant reference voltage between junction 220 and lead 210. This voltage is made variable by the variable resistor 228 and the resistor 230 and is selected by the setting of the slider 231.

The primary winding 158 of transformer 160 is connected in series circuit with the primary winding 162 of the welding transformer 164. Thus whenever current flows in the welding transformer primary 162, current flows in the primary winding 158 and a voltage proportional to the current will be induced in the secondary winding 180. This voltage is rectified by the tube 192 and is impressed across the capacitor 202. The capacitor has one of its terminals connected through the current limiting resistance 232 to the slider 231, and thus is connected to one side of the reference voltage source. The other side of the reference voltage provided by resistors 228 and 230 is connected through lead 210 to the cathode of vacuum tube 234. The other terminal of the capacitor 202 is connected through a junction 204 to the grid of tube 234. The polarity of the charge across capacitor 202 impressed by tube 192 opposes the potential at the slider 231. Thus during standby conditions, when no current flows through the welding transformer primary winding 162, the capacitor will be discharged and the tube 234 will be biased to full conduction by the potential impressed between the grid and cathode of tube 234 by the voltage at slider 231.

The heat control panel 10 is connected between the weld firing tube 14 in the timer and the firing tubes 170 and 174 on the ignition panel 12. This panel 10 controls the firing of tubes 170 and 172 and these tubes in turn control the conduction of the ignitron tubes 142 and 144. In this fashion the heat control devices indirectly control the welding load current.

During standby conditions the cathode 48 of tube 44 is connected to the anode of the "weld" tube 14 in the timer. The cathode of the weld tube 14 and the anode 46 of tube 44 are connected across the secondary 20 so the anodes of tubes 14 and 44 will be positive on L2 polarity. The conduction of tube 44 is therefore dependent upon conduction of the weld tube 14.

The A.C. voltage from secondary winding 24 is phase shifted by means of resistance 72 and capacitor 76. The junction 74, which is located between resistor 72 and capacitor 76, is connected to the shield grid 60 of tube 44. The winding 24 and capacitor 76 are also electrically tied to the cathode 48 of tube 44 to provide a sine wave voltage across capacitor 76 which lags the sine wave voltage on anode 46 by a predetermined amount depending on the electrical characteristics of the resistor 72 and capacitor 76 which preferably equals 85° lag in the voltage waves.

Resistor 98 loads rectifying diode 102 so the diode will rectify properly. Resistor 104 and capacitor 110 are RC filters; resistor 108 acts as a bleeder for capacitor 110. One side of capacitor 110 is connected to the cathode 54 of tube 50. The other side of capacitor 110 has a negative voltage bias thereon because of the voltage dividing action of resistor 98 and diode 102. This negative voltage bias is fed to the shield grid 62 through a charging circuit of capacitor 88; resistor 90, and diode 92 in series with winding 94. The negative voltage bias on the shield grid 62 normally holds tube 50 from conducting.

When the weld timer tube 14 conducts, about 100 volts A.C. are impressed across anode 46 and cathode 48 of tube 44. The phase shifted A.C. voltage on the shield grid 60 will cause tube 44 to conduct at exactly 85° on the supply voltage wave. During tube 44 conduction, the diode 82 rectifies the A.C. voltage from winding 20 passing through tube 14 thereby causing capacitor 78 to charge positive. Resistor 70 loads the diode 82 and also serves as a bleeder for capacitor 78. Transformer 66 primary winding 64 will take a pulse when tube 14 conducts. The pulse from the secondary winding 94 of transformer 66 is rectified by diode 92 and charges capacitor 88 with a positive charge which is greater than the D.C. bias voltage present on capacitor 110. Resistor 90 is used for a fixed delay in discharging the capacitor 88.

The control grid 56 of tube 44 has a voltage impressed upon it which is also phase shifted; this voltage is initially adjusted by potentiometer 116 and resistor 114 and is caused to lag behind the supply voltage. In practice, potentiometer 116 is used to adjust the phase shift network for power factor deviations when the welder is installed. The phase shifting network consists of transformer windings 26 and 28, resistor 114, potentiometer 116 and capacitor 120. The current regulator 11 provides a positive bias to the output of the phase shift network. During standby conditions this positive bias is at a maximum and an increase in current through the welding transformer 160 results in a decrease of the bias and thereby an increase in the phase shifted voltage between the voltage on the control grids 56 and 58 of tubes 44 and 50 and the voltage on the anodes of these tubes so that the tubes 44 and 50 will conduct at any point along the positive anode voltages. The control grid voltage of tube 44 is that voltage appearing across resistor 122 and the bias provided by the current regulator 11. The control grid voltage of tube 50 is the voltage across resistor 126 and the bias provided by the current regulator. If the bias provided by the current regulator 11 is at a maximum then the phase shifted voltages on the grids of tubes 44 and 50 will reach the critical grid voltage of these tubes sooner during the positive half cycle of the anode voltage of tubes 44 and 50. Thus a maximum current will flow in the weld transformer. If bias provided by the current regulator is at a minimum, then the phase shifted voltage on the grids of tubes 44 and 50 will reach the critical grid voltage of the tubes later and the tubes will conduct for only a small portion of the cycle during which their anode voltage is positive.

The positive charge of capacitor 88 is greater than the D.C. bias voltage from capacitor 110. Therefore when tube 14 conducts, a positive voltage is impressed on the shield grid 62 to transfer control of the tube 50 from the shield grid 62 to the grid 58. This positive voltage will allow tube 50 to be grid controlled and conduct when anode 52 becomes positive. The charge in capacitor 88 will last for approximately one half cycle because of resistor 90.

From the foregoing it is apparent that during the first half cycle of conduction, the phase shift network including resistor 72 and capacitor 76 will cause the firing of tube 44 to be delayed. When the tube 44 is again ready for conduction, the capacitor 78 will have been charged by the previous conduction of the weld tube 14 to render the shield grid 60 positive and therefore unable to take over control of the conduction of tube 44. This means that the conduction of tube 44 will be delayed for the intial half cycle only. In this connection it is to be noted that the initial conduction of tube 44 will be delayed only if phase shifted voltage and current regulator bias on control grid 56 is set to cause firing of the tube 44 earlier than 85°. If control grid voltage 56 is set to cause firing of tube 44 later than 85°, then the initial delay will be cancelled and the tube 44 will be controlled by the grid of the tube during the initial as well as succeeding half cycles. To insure consistent 85° firing at start of each weld, timer circuit 16 is so arranged that tube 14 always fires for full half cycles.

When tube 44 on the heat panel 10 conducts for the duration of weld time as determined by the conduction of tube 14, a pulse voltage is passed through primary winding 130 of transformer 132. This pulse is coupled to the grid 170g of tube 170 by the secondary winding 138 and overcomes the bias provided by battery 178 which normally holds tube 170 nonconducting. The leading edge of the pulse is variable depending upon conduction angle of tube 44 which in turn is governed by the delayed firing circuit and the bias provided by the current regulator 10. Thus tube 170 conducts at the proper firing angle completing the circuit from lead 148 through the welding transformer primary winding 162, the current regulator primary transformer winding 158, lead 154, junction 152, tube 170, junction 174, the ignitor 142i to cathode 142c, junction 150 and lead 146. This conduction causes an arc to form between the ignitor 142i and the cathode 142c of the lead ignitron 142 causing the anode 142a to conduct to the mercury pool cathode 142c thereby shunting the firing circuit. Since the firing circuit conducts lead current until the ignition takes over, this circuit is called "anode firing."

Similarly, when tube 50 on the heat panel conducts, a pulse voltage is coupled through transformer 136 secondary winding 140 to the grid 172g of tube 172 which overcomes the D.C. bias provided by battery 179. Thus tube 172 conducts at the proper firing angle completing the trail circuit from lead 146 and the welding transformer to lead 148.

From the above it is apparent the conduction of tube 14 will cause cancellation of hold off bias on both the lead tube 44 and the trail tube 50. During the initial half cycle of conduction of tube 14, the shield grid 60 of the lead tube 44 has an A.C. bias present thereon which will permit the tube 44 to conduct only at a predetermined point on the voltage wave of its anode supply. After the first half cycle this A.C. bias is overcome by the charge impressed on capacitor 78 so the subsequent conduction of the tube 44 after the initial half cycle is controlled by the A.C. bias impressed on the control grid 56 by the phase shift network.

Also before tube 14 conducts, the bias on the shield grid 62 of tube 50 holds tube 50 from conducting. When tube 14 conducts, the windings of transformer 66 will cause capacitor 88 to become charged to overcome the original hold off bias on the shield grid 62. Therefore on each succeeding half cycle after the conduction of tube 44, trail tube 50 conducts to provide a positive lead-trail tube conduction.

The operation of the current regulator is as follows: when current flows in the primary winding 158, a voltage proportional to the current will be induced in the secondary winding 180. The tube 192 provides a full wave rectification for the output voltage of the secondary winding and is connected in series with the capacitor 202 to charge the capacitor with the peak values of the voltage signal provided by the secondary winding 180. This result is achieved by carefully selecting the electrical values of the capacitor 202 and the resistor 200 so the peak voltage signal on capacitor 202 will be maintained without sacrificing the response time of the regulator. In the preferred embodiment of our invention the capacitor 202 was selected to have a capacitance of 0.25 mfd. and the resistor 200, which provides the discharge path for the capacitor 202, a resistance of 22K ohms which will provide approximately one to two cycles for changes in the supply voltage or variations in impedance in the load circuit of the secondary winding of the welding transformer 164. In this connection it is to be noted the presence of the center tapped resistor divider including resistors 186 and 188 will slightly reduce the potential impressed on capacitor 202 by the output of the secondary winding 180. If the resistors 186 and 188 are eliminated and the lead extending from junction 204 is connected directly to a center tap on winding 180 instead of the junction 190, the capacitor will be charged to substantially the peak values of the voltage output of winding 180.

The charging circuit and the connection of the capacitor 202 to the grid of tube 234 is arranged so the positive grid to cathode bias provided by the reference voltage at slider 231 is decreased as the charge on the capacitor 202 increases. Thus an increase in current flow in the primary winding 158 will cause a decrease in conduction of tube 234. When the tube 234 is fully conducting, as during standby conditions, the potential at junction 236, i.e., the anode of tube 234, will be approximately equal to the potential of lead 210 if the voltage drop across tube 234 is ignored. As the conduction of tube 234 is decreased, the potential of the junction 236 increases, i.e., becomes more positive. As is well known, the output provided by the rectifier tube 192 will constitute a direct current voltage on which an alternating current ripple is imposed. The alternating current ripple is impressed on the grid of tube 234 and normally would appear in an amplified form at junction 236. The capacitor 244 which is connected between the grid and anode of tube 234 at junction 236 filters the alternating current ripple by feeding back a portion of the amplified ripple voltage to the grid of tube 234. Thus the circuit will provide a very low amplification for the alternating current ripple voltage without sacrificing the full amplification for the direct current voltage changes across capacitor 202.

The current regulator 11 contains a bridge circuit which consists of the regulated supply, including resistors 226 and 222 in one leg, the tube 218 in another leg and resistor 238 in a third leg and tube 234 in the fourth leg. The junctions 236 and 220, to which the output leads 250 and 248 are respectively connected, constitute the intermediate terminals of the bridge. The output signal from the bridge circuit to the leads 248 and 250 is essentially a direct current and during balance conditions, that is, when the current flow through the primary winding 158 is equal to the setting determined by the position of the slider 231 on the adjustable resistor 228, the potential between junctions 236 and 220 will be zero. The voltage difference between junctions 236 and 220 is applied to the grid and cathodes of tubes 44 and 50 in the heat control panel 10. It is clearly apparent that variations in the supply voltage and variations in the impedance of the secondary winding of the welding transformer will be reflected as current changes in the primary winding 158. These variations thus provide a feedback voltage signal which is compared with a reference voltage signal. The differences between these voltage signals is amplified by tube 192 and the bridge circuit becomes unbalanced as the junction 236 becomes more positive. The junction 236 is connected by lead 250 to the cathodes of tubes 44 and 50 and the junction 220 is connected to the grids of tubes 44 and 50 by lead 248. Thus as the junction 236 becomes more positive in polarity, the firing angles of tubes 44 and 50 during their respective half cycles of conduction is delayed and less current flows though the welding transformer primary. The change in the firing angles of tubes 44 and 50 is sufficient to compensate for the changes in the supply voltage or changes in the impedance in the secondary circuit of the welding transformer. Thus a peak value of the current flow through the welding transformer is maintained which results in a corresponding overcompensation of the root mean square value of the welding current.

The diode 246 is included in the bridge circuit to limit the output of the bridge circuit to a selected minimum value and will prevent complete cutoff of conduction of tubes 44 and 50 during severe changes in the supply voltage or load changes in the welding transformer secondary circuit when the potentiometer is adjusted to bias the grid of tube 234 less positive and thereby decrease the conduction of tubes 44 and 50 for minimum current flow through the welding transformer.

As was previously indicated, the junction 236 becomes increasingly positive when the conduction of tube 234 decreases. The diode 246 which is connected between the junction 236 and the junction 224 limits the positive traverse of junction 236 by conducting current from junction 236 to junction 224 whenever the junction 236 becomes more positive in polarity than junction 224.

When the control previously described is used to control the flow of current through a welding transformer, the phase shift circuit is adjusted to cause the ignitrons to conduct at a maximum. During the first half cycle of current flow the current flow through the welding transformer is purposely initiated at a precise point on the voltage wave of the source to minimize transient currents and voltages in the welding transformer. The flow of current through the transformer during the first or lead half cycle will cause the current regulator 11 to reduce the bias on the control tubes of the heat control circuit 10. If the slider 231 is adjusted for maximum weld current, the peak value of the voltage impressed on capacitor 202 will be insufficient to balance the control of the reference voltage at slider 231 on the grid of tube 234 and the flow of welding current flow during the trail cycle will be greater than dictated by the setting of slider 231. However, this greater current flow, because the current regulator 11 is responsive to peak values of the voltage induced in secondary 180, will cause the current flow during the succeeding lead cycle to more nearly approach the current flow dictated by the position of the slider 231. If, on the other hand, the slider 231 is adjusted for minimum welding current flow, then the current flow through the weld transformer during the initial half cycle will cause the bias provided by capacitor 202 to exceed the bias provided by slider 231 and the current flow through the welding transformer on the initial trail half cycle will be less than the current flow dictated by the setting of slider 231. This will cause the regulator to adjust the phase shift circuit so the current flow through the welding transformer during the succeeding lead half cycle is greater than that required by the setting of the slider 231 so that because the current regulator detects the peak values of the current flow through the welding transformer, the current regulator will rapidly cause the current flow to approach the amount dictated by the setting of slider 231.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a circuit for effecting the passage of alternating current to a load including a transformer, the combination comprising; a pair of electronic switches connected to pass alternate half cycles of alternating current through the transformer, means for selectively rendering said switches conducting, a phase back circuit having an output for controlling the points on the supply voltage wave at which the switches are rendered conducting, means independent of current flow in the load for phasing back only the initial half cycle conducting point of one of said switches later than the normal conducting point to provide a minimum circuit transient in the transformer, and means substantially responsive to peak current flow in the load connected to the phase back circuit and operative after said initial half cycle for regulating the output of the phase back circuit and thereby overcompensating the changes in current flow through the load in response to variations from a predetermined current flow through the load.

2. In a control circuit, the combination comprising; a source of alternating current, a load including a transformer, a pair of electronic switches connected to pass alternate half cycles of current from the source to the load, means for selectively rendering the switches conducting, a phase shift means providing an output signal for controlling the points on the voltage wave of the source at which said switch are rendered conducting and arranged to cause maximum conduction of the switches during each half cycle, means independent of current flow in the load for initiating the conduction of the switches at a predetermined point of the voltage wave of the source during the first half cycle conduction of the first of said switches to be rendered conductive and means for adjusting the phase shift means substantially in response to peak current flow in the load for overcompensating the changes in current flow through the load in response to variations from a predetermined current flow through the load.

3. In a control circuit, the combination comprising; a source of alternating current, a load including a transformer, a pair of electronic switches conductive for passing alternate cycles of current from the source to the load, a phase back circuit connected to the switches and providing an output signal for controlling the conduction periods of the switches and arranged for normally causing said switch to conduct maximum current during the half cycles, a means responsive to the peak value of the current in the load and connected to the phase back circuit for varying the output signal of the phase back circuit and thereby overcompensate the changes in current flow through the load in response to variations in voltage of the source and variations in impedance of the transformer, and means independent of current flow in the load for phasing back only the initial half cycle conducting point of the switches later than the normal conducting point provided by the phase back means for providing a minimum transformer circuit transient.

4. In a control circuit, the combination comprising; a source of alternating current, a load including a transformer having a primary winding and a secondary winding, a variable impedance connected in circuit with the secondary winding, a pair of electronic switches connected to pass alternate half cycles of current from the source through the primary winding, a phase back means connected to the switches for controlling the initiation of conduction of the switches during said half cycles, a means connected to the phase back means for normally causing substantially full half cycle conduction of the switches and connected in circuit with the primary winding for delaying the initiation of conduction of the switches during the half cycles substantially in response to peak current flow in the primary winding for overcompensating the changes in current flow through the load in response to variations in voltage of the source and impedance in the secondary winding circuit, and means for delaying the initiation of conduction of said switches only during the first half cycle of current flow through the primary winding for minimizing circuit transients in the transformer.

5. The combination as recited in claim 1 wherein the means which regulates the current flow in the load is responsive to the peak value of the current so as to provide overcompensation of the R.M.S. value of the regulated current.

6. The combination as recited in claim 1 wherein the means which regulates the current flow in the load in response to current flow in the load is connected to the phase shift network to bias the electronic switches for maximum conduction during periods when the electronic switches are nonconductive.

7. In a control circuit for effecting the passage of alternating current flow to a load including a transformer, the combination comprising; a pair of electronic switches connected to pass alternate half cycles of alternating current from a source through the transformer, a means including a phase shift circuit connected to said switches for varying the points on the voltage wave of the alternating current source at which conduction of the switches is initiated and for causing the switches to initiate conduction in a lead-trail sequence, a second means connected to the first mentioned means to cause the initiation of conduction of the lead switch to occur at a predetermined point on the voltage wave of the alternating current source during the first half cycle of conduction of the lead switch, said second means being operative only during the said first half cycle for minimizing circuit transients in the transformer, a third means substantially responsive to peak current flow in the load and connected to the first mentioned means for normally biasing the output of the phase shift circuit for causing maximum conduction of the switches and arranged in response to current flow in the load for varying said biasing for regulating the current flow in the load and overcompensating the changes in current flow through the load in response to variations in voltage of the alternating current source and impedance of the load.

References Cited by the Examiner

UNITED STATES PATENTS

| | | | |
|---|---|---|---|
| 2,602,155 | 7/52 | Michelet | 323—34 |
| 2,844,784 | 7/58 | Thomsen | 323—18 |
| 2,873,421 | 2/59 | Mierendorf et al. | 323—58 |
| 2,975,356 | 3/61 | Cooper et al. | 323—18 |

LLOYD McCOLLUM, *Primary Examiner.*

MILTON O. HIRSHFIELD, *Examiner.*